(12) United States Patent
Poledna et al.

(10) Patent No.: US 10,359,772 B2
(45) Date of Patent: Jul. 23, 2019

(54) FAULT-TOLERANT METHOD AND DEVICE FOR CONTROLLING AN AUTONOMOUS TECHNICAL SYSTEM THROUGH DIVERSIFIED TRAJECTORY PLANNING

(71) Applicant: FTS Computertechnik GmbH, Vienna (AT)

(72) Inventors: Stefan Poledna, Klosterneuburg (AT); Georg Niedrist, Guntramsdorf (AT); Eric Schmidt, Grosskrut (AT); Christopher Helpa, Vienna (AT); Hermann Kopetz, Baden (AT)

(73) Assignee: TTTECH AUTO AG, Vienna (AT)

( * ) Notice: Subject to any disclaimer, the term of this patent is extended or adjusted under 35 U.S.C. 154(b) by 177 days.

(21) Appl. No.: 15/677,878

(22) Filed: Aug. 15, 2017

(65) Prior Publication Data

US 2018/0052453 A1    Feb. 22, 2018

(30) Foreign Application Priority Data

Aug. 16, 2016   (AT) .............................. A 50737/2016

(51) Int. Cl.
*G05B 23/02* (2006.01)
*G06F 11/20* (2006.01)
(Continued)

(52) U.S. Cl.
CPC ..... *G05B 23/0245* (2013.01); *G05B 23/0294* (2013.01); *G06F 9/4494* (2018.02);
(Continued)

(58) Field of Classification Search
CPC ............ G05B 23/0245; G05B 23/0294; G06F 9/4494; G06F 11/20; G06F 11/3692
(Continued)

(56) References Cited

U.S. PATENT DOCUMENTS 9,269,270 B2 *   2/2016   Fehse et al.   ........ B60W 30/095
2016/0033965 A1 *   2/2016   Kopetz   .................. G05B 23/02
(Continued)

FOREIGN PATENT DOCUMENTS

EP          2592554 A2     5/2013

OTHER PUBLICATIONS

European Search Report for European Application No. 17184468.1, dated Oct. 12, 2017 (8 pages).
(Continued)

*Primary Examiner* — Thomas G Black
*Assistant Examiner* — Wae L Louie
(74) *Attorney, Agent, or Firm* — Eversheds Sutherland (US) LLP

(57) ABSTRACT

An innovative method is provided by which a complex electronic system for controlling a safety-critical technical process, for example driving an autonomous vehicle, can be implemented. A decision is made between simple and complex software, wherein the simple software is implemented on error-tolerant hardware and wherein a plurality of different versions of the complex software are simultaneously implemented in independent fault containment units (FCU) and wherein a result that is to be transmitted to the actuators is selected by a decider from the results of the complex software that is implemented using the simple software.

8 Claims, 2 Drawing Sheets

(51) Int. Cl.
*G06F 11/36* (2006.01)
*G06F 9/448* (2018.01)

(52) U.S. Cl.
CPC ........ *G06F 11/20* (2013.01); *G06F 11/3692* (2013.01); *G06F 2201/805* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 2016/0232126 A1* | 2/2016 | Kopetz | .................... | G05D 1/02 701/23 |
| 2016/0281494 A1* | 9/2016 | Shirdel et al. | ........... | G05D 1/02 |
| 2017/0105163 A1* | 4/2017 | Hu et al. | ................. | E21B 47/06 |
| 2017/0262330 A1* | 9/2017 | Kopetz | ................... | G06F 11/07 |
| 2018/0052453 A1* | 2/2018 | Poledna et al. | ....... | H04W 40/06 |
| 2018/0052465 A1* | 9/2018 | Kopetz et al. | ........... | G05D 1/02 |
| 2018/0267550 A1* | 9/2018 | Poledna et al. | ....... | G06F 15/173 |

OTHER PUBLICATIONS

Office Action, Austrian Application No. A 50737/2016, dated Jul. 24, 2018 (4 pages).
Kopetz, H., Real-Time Systems (2nd Ed.), pp. 84-88. 128-130, 155-158, Springer Verlag (2011).
Avizienis, A., The N-Version Approach to Fault-Tolerant Software, IEEE Transactions on Software Engineering, Dec. 1985, pp. 1491-1501, vol. SE-11, No. 12.
Federal Aviation Administration, System Safety Analysis and Assessment for Part 23 Airplanes, Advisory Circular No. 23.1309-1E, issued Nov. 17, 2011 (56 pages).
Automotive Safety Integrity Level, Wikipedia, last modified on May 19, 2017 (9 pages).
Autonomes Fahren, Wikipedia, last modified on Aug. 22, 2017 (12 pages).

* cited by examiner

FAULT-TOLERANT METHOD AND DEVICE FOR CONTROLLING AN AUTONOMOUS TECHNICAL SYSTEM THROUGH DIVERSIFIED TRAJECTORY PLANNING

CROSS-REFERENCE TO RELATED APPLICATIONS

Priority under 35 U.S.C. 119(b) is claimed to Austrian Patent Application No. A 50737/2016, filed Aug. 16, 2016, which is incorporated herein by reference in its entirety.

TECHNICAL FIELD

The present invention is within the field of computer technology. It relates to a method and an electronic system for error-tolerant control of an autonomous technical system, in particular of a vehicle.

BACKGROUND

The developments in sensor technology and computer technology permit the largely autonomous control of a technical system or of a vehicle that autonomously controls its destination.

According to Wikipedia [2], the classification of autonomous driving is organized into six levels:
Level 0: "Driver only," the driver himself drives, steers, accelerates, brakes, etc.
Level 1: Designated assistance systems help with vehicle operation (including ACC).
Level 2: Partial automation. Among others, automatic parking, lane-keeping function, general longitudinal guidance, acceleration, braking etc. are taken over by the assistance system (such as traffic jam assistance).
Level 3: High-level automation. The driver does not have to monitor the system continuously. The vehicle conducts independent functions such as triggering turn indicators, lane changes and lane tracking. The driver can attend to other things, but is required to take over driving from the system within a preliminary warning period, as needed. This form of autonomy is technically feasible on highways. The legislature is working towards permitting Level 3 vehicles. There is talk of a time frame by 2020.
Level 4: Full automation. The guidance of the vehicle is continuously taken over by the system. If the driving tasks are no longer managed by the system, the driver may be required to take over the driving.
Level 5: Full autonomy of the vehicle. The vehicle is provided without a steering wheel, the vehicle can move around without a driver.

Level 2 has been currently realized in vehicles available on the market. At Level 2, the driver is required to continually monitor the proper functioning of the computer system and to intervene immediately in the event of a fault. At the higher automation levels, the computer system must be designed to be error tolerant in order guarantee the safety of the vehicle even in the event of an error in the computer system.

In the ISO 26262 standard, an electronic system (hardware plus software) in a vehicle must be assigned to one of four integrity levels (Level ASIL A to ASIL D), wherein the Level ASIL D represents the highest level of integrity [3]. The integrity of electronic systems for fully automated vehicle operation (Level 4 and Level 5) must conform to ASIL D. Whereas the probability for an occurrence of a dangerous error having serious implications for the safety of a vehicle at Level ASIL B must be less than $10^{-6}$ per hour (d.s. $10^3$ FIT), this probability at ASIL D must be less than $10^{-8}$ per hour (d.s. 10 FIT).

The cause for the occurrence of a failure of an electronic system may be an error due to hardware aging (physical fault) or a design error (design fault).

An aging error is present if an assembly that was fully functional at the beginning of its useful life fails because of aging processes of the hardware. For state of the art automotive chips, the permanent error rate for errors due to aging is <100 FIT. By using active redundancy (TMR or self-checking components), the required error rate for ASIL D (less than 10 FIT) can be achieved in the hardware.

Design errors may be present in the hardware or in the software. The consequences of hardware design errors can be mastered using the active redundancy of diverse hardware.

Measures that result in a reduction in the probability of the presence of an undetected design error in the software are a systematic design process, verification and validation, primarily by comprehensive testing. A significant cause for the occurrence of design errors in the software is the complexity of the software. According to the state of the art, it is possible to so thoroughly validate a complex software system that the required error rate for ASIL B can be achieved, but not that of ASIL D.

BRIEF DESCRIPTION OF THE INVENTION

The present invention discloses a method and a hardware architecture for increasing the reliability of a complex electronics system. By targeted use of hardware and software redundancy, the reliability of the electronic system is significantly increased.

In the field of safety technology in air and space travel, a distinction is made between simple and complex software [4]. If the software that is used is simple and formally verified and/or can be comprehensively tested, it is then assumed that the required error rate for ASIL D can be attained through a careful development process.

If the software that is used is complex, it is then assumed that the probability for the occurrence of design errors corresponds to that of ASIL B. Through software redundancy, meaning the parallel execution of two or more different ASIL B software systems with a subsequent, usage-specific comparison of the results, the reliability of the software can be significantly increased. A method for increasing software reliability by active redundancy (TMR) using diversified software is described in [5]. This method is not applicable, however, if the different software versions do not behave in a replica deterministic manner.

Diversified software is not replica deterministic if there is a non-deterministic design Construct (NDDC) [6, p 128] in the software. An NDDC differentiates between two correct but non-compatible scenarios. In general, it cannot be assumed that two different versions of the software having NDDCs will arrive at comparable results.

If, for example, a boulder is lying in the street and a decision must be made whether this boulder should be bypassed on the left or the right, it cannot be generally assumed that two different software versions will arrive at the same result. Although both results are correct, they are not replica deterministic. Error tolerance is thus lost.

The autonomous operation of a motor vehicle requires a software system for image recognition, environmental modeling and trajectory planning. This software system is not simple, but rather complex and includes NDDCs.

According to the invention, it is proposed to identify the NDDCs contained in the entire software system and to remove them from the software system. An NDDC that makes a judgment between proposed alternatives is realized using simple software without software redundancy. The simple software is implemented on error-tolerant hardware in order to mask hardware errors that arise.

The reliability of the remaining complex software without NDDCs is significantly increased by a comparison of results from a plurality of different versions of the complex software that are executed on independent fault containment units (FCUs). The complex software determines a plurality of alternatives that are passed on to a decider for a decision.

BRIEF DESCRIPTION OF THE DRAWINGS

The present invention is explained using the following drawings.

DETAILED DESCRIPTION OF AN IMPLEMENTATION

Figure 1:
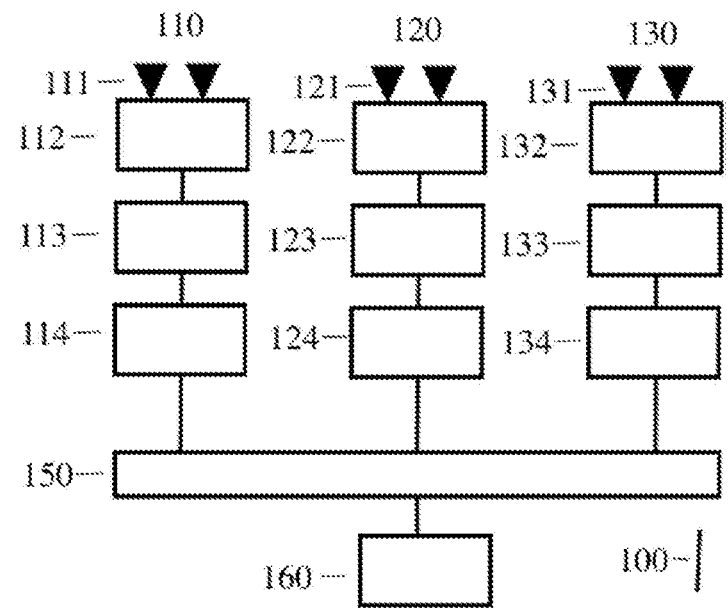
FIG. 1 shows a data flow diagram of a complex electronic system for autonomous control of a vehicle.

The following concrete description of an implementation addresses one of the many possible executions of the new method using the example of an autonomous vehicle control system. The description uses terms that are described more accurately below.

A controlled object (abbreviated CO) is a technical system that is controlled by a computer system and/or a person and has the goal of performing a predetermined task over a period of time under specific environmental conditions. Examples of COs are: a vehicle, an airplane, an agricultural machine, a robot or a drone.

An environmental model is a digital data structure which at a given instant represents an image of the essential characteristics of the environment in the previous description. An example of an environmental model is the description of a street and the objects found on the street at a given instant.

A trajectory is a path that a CO can follow in the course of time in order to complete the given task. The characteristics of the trajectories of a CO depend upon the design of the CO, the given task and the current environmental conditions. For example, one can refer to a possible path that a vehicle can follow under given environmental conditions in order to reach its destination as a trajectory.

A software process is understood to be the execution of a program system on one or more computers.

A fault containment unit (FCU) is an assembly that encapsulates the immediate consequences of an error cause (6, p 155).

The term error-tolerant hardware is to be understood as a hardware architecture that masks hardware errors which arise that correspond to the aforementioned error hypothesis. Examples of such hardware architectures are triple modular redundancy (TMR) or the parallel implementation of software on self-checking assemblies as described in (6, p. 156).

In accordance with the state of the art, the redundant FCUs receive their input data over at least two independent communications channels and transmit their output data over at least two independent communication channels.

A data flow path (DFP) is a sequence of software processes, wherein the first software process reads input data and the output data of a previously stored software process represent the input data for the ensuing software process. The output data of the last software process are the result data of the DFP. In many usage cases of real-time data processing, a DFP is cycled through. Between the cycles of a DFP, the interior condition [6, p. 84] of a software process can be stored. In many usage cases of real-time data processing, the first software process of a DFP acquires the sensor data and the last software process of a DFP produces the target values for the actuators.

Two DFPs are diverse if they pursue the same destination setting, but the software processes of the DFPs use different algorithms (algorithmic diversity) and/or different input data (data diversity).

Environmental modeling is a software process that creates an environmental model based on the static data of the environment and the dynamic data of the environment collected from different sensors.

A trajectory design is a software process that, on the basis of a given environmental model, determines one or more possible trajectories which solve a predetermined task.

A decider is a usage-specific software process that receives a number of proposals as input data, analyzes these proposals and has the freedom to arrive at a decision as to which—possibly changed—proposal is selected. In many cases, a decider is an NDDC. For example, a decider receives a number of proposals for possible trajectories of a vehicle as input and decides on one—possibly changed—trajectory that will be implemented.

For example, the term "observed data" could be understood to comprise the data that arise from observation.

FIG. 1 shows a data flow diagram of a complex electronic system for autonomous control of a vehicle. Vertical connection lines 100 of the box in FIG. 1 show the data flow from top to bottom.

In FIG. 1, three different DFPs 110, 120, and 130 are illustrated. Each of the DFPs provides observation of the environment of the vehicle via its own sensors. The sensors are read cyclically. DFP 110 has sensors 111, DFP 120 has sensors 121 and DFP 130 has sensors 131. Examples of vehicle sensors are cameras, radar sensors, LIDAR sensors and ultrasound sensors. In the first processing step of the DFP, the raw sensor data are read off and pre-processed. This is software process 112 in DFP 110, software process 122 in DFP 120 and software process 132 in DFP 130.

It is advantageous if software processes 112, 122 and 132 use different algorithms (algorithm diversity) that are supplied with different input data (data diversity).

It is advantageous, if sensors 111, 121 and 131 observe the environment simultaneously. Simultaneous observation can be achieved via a distributed trigger signal derived from an error-tolerant global time.

In the second processing step of the DFP, the environmental modeling is completed on the basis of the received sensor data and information about the static environmental parameters (e.g. from the maps of the navigation system). That is software process 113 in DFP 110, software process 123 in DFP 120 and software process 133 in DFP 130.

It is advantageous if software processes 113, 123 and 133 use different algorithms (algorithm diversity) that are supplied with different input data (data diversity).

In the third processing step of a DFP, the trajectory planning is completed on the basis of the environmental model defined in the second processing step. That is software process 114 in DFP 110, software process 124 in DFP 120 and software process 134 in DFP 130.

It is advantageous if software processes 114, 124 and 134 use different algorithms (algorithm diversity) that are supplied with different input data (data diversity).

The trajectory planning in the third processing step develops a plurality of alternative trajectories for reaching the destination that are offered to the subsequent software process, decider 150. The proposed trajectories are evaluated by the trajectory planning from the standpoint of safety and effectiveness with respect to reaching the destination. Decider 150 thus includes a plurality of differently evaluated proposals for trajectories to trajectory plannings 114, 124 and 134 and decides on one trajectory, which is proposed and properly assessed by at least two of the three trajectory planning processes 114, 124 and 134. Finally, the target values for implementing the chosen trajectory—namely steering, braking and speed—are calculated by decider 150 and submitted to intelligent actuators 160.

It is advantageous if the transmission of the trajectory proposals from software processes 114, 124 and 134 takes place almost simultaneously to decider 150. This can be achieved by deriving the trigger signals for action from the progression of an error-tolerant global time.

In the following section, an example of a different strategy is described. While DFP 110 and DFP 120 follow the same task—driving the vehicle to the planned destination—DFP 130 has the task of guiding the vehicle as quickly as possible into a safe state, e.g. parking on the side of the road. If decider 150 cannot find a trajectory that conforms to the suggested alternatives from DFP 110 and DFP 120, decider 150 then takes the proposal from DFP 130 and gives the target values to actuators 160, which guide the vehicle into a safe state (e.g. parking on the side of the road).

Combining these two strategies allows for the formation of an additional strategy: Three DFPs are implemented to reach the destination and an additional DFP is implemented for achieving a safe state.

Figure 2:
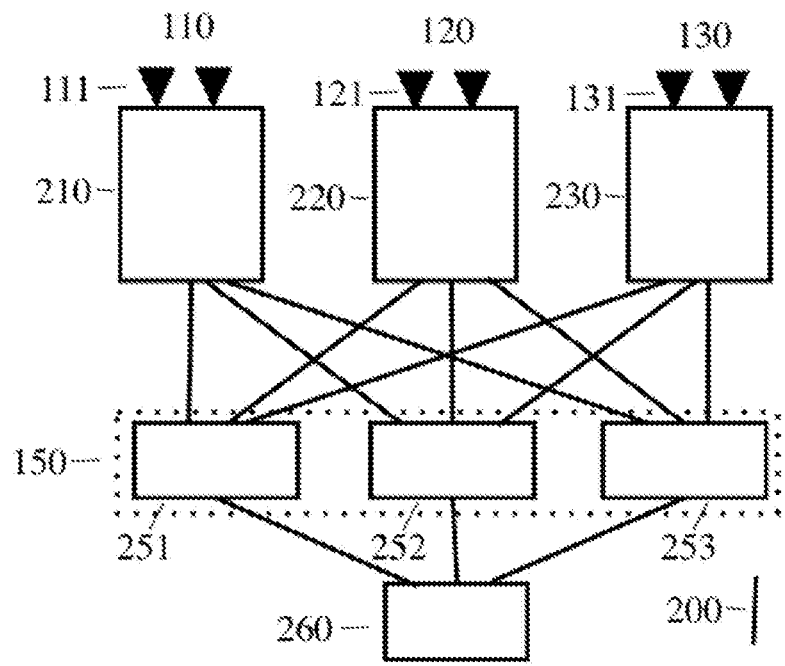
FIG. 2 shows a possible hardware architecture for implementing the complex electronic system of FIG. 1 having TMR hardware for execution of the NDDC.

FIG. 2 shows a possible hardware structure for implementing the DFPs in FIG. 1. The boxes in FIG. 2 represent assemblies. Connecting lines 200 of the assemblies in FIG. 2 show the available communication channels for transmitting data.

DFP 110 includes sensors 111 and assembly 210. DFP 120 includes sensors 121 and assembly 220. DFP 130 includes sensors 131 and assembly 230. Assembly 210 forms a fault containment unit (FCU) that contains the hardware components (node computer, data lines, storage) for implementing software processes 112, 113 and 114 of DFP 110. Assembly 220 forms a fault containment unit (FCU) that contains the hardware components (node computer, data lines, storage) for implementing software processes 122, 123 and 124 of DFP 120. Assembly 230 forms a fault containment unit (FCU) that contains the hardware components (node computer, data lines, storage) for implementing software processes 132, 133 and 134 of DFP 130.

Decider 150 in FIG. 1 is simultaneously executed on three node computers 251, 252 and 253 in a replica deterministic manner in order to be able to mask hardware errors. The results of the three node computers 251, 252 and 253 are transferred to intelligent actuator control 260, which performs a bit-by-bit two-of-three vote.

Figure 3:
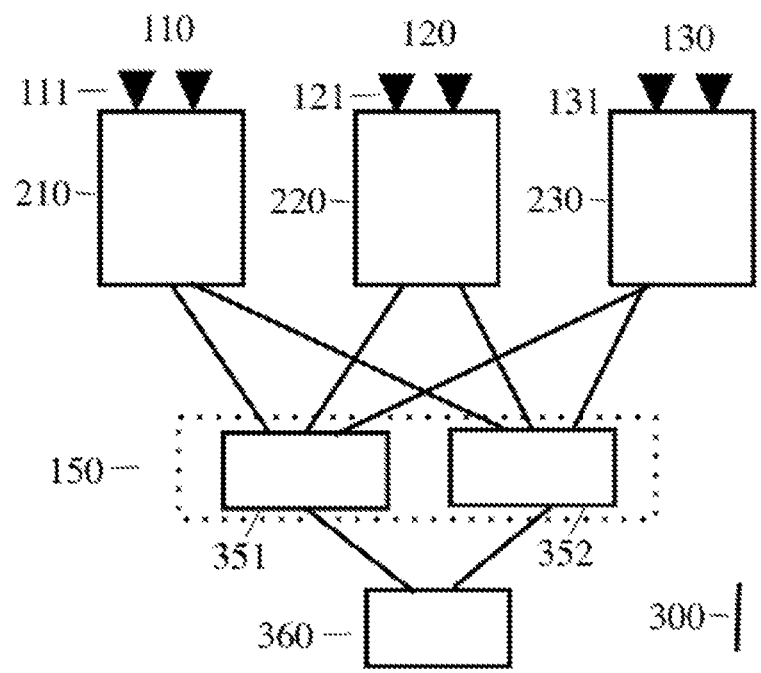
FIG. 3 shows a possible hardware architecture for implementing the complex electronic system of FIG. 1 having self-checking hardware for execution of the NDDC.

FIG. 3 shows a different hardware structure for implementation of the DFPs in FIG. 1. The boxes in FIG. 2 represent assemblies. Connecting lines 200 of the assemblies in FIG. 2 show the available communication channels for transmitting data. In contrast to FIG. 2, in FIG. 3, decider 150 is implemented on two self-checking assemblies 351 and 352. Intelligent actuator control 360 accepts one of the results from 351 or 352. Because the software processes that run-on assemblies 351 and 352 are replica deterministic and the hardware of assemblies 351 and 352 check themselves, the results from assemblies 351 and 352 must be identical.

The diversity of the complex software can be achieved either through data diversity or through algorithmic diversity or by using both data diversity and algorithmic diversity. It is a large advantage if both data diversity and algorithmic diversity are implemented.

If only one diversity is used for economic reasons, there are some possibilities for cost reduction.

If data diversity of the DFPs is omitted, one sensor can transfer the received data to a plurality of DFPs.

Data diversity can be improved if the various DFPs use different coordinate systems for representing the trajectories.

If algorithmic diversity of the DFPs is omitted, the same algorithm can be used in all DFPs.

During ongoing operations, it is very difficult to decide whether a discrepancy in the result of one DFP was caused by the two other DFPs because of an aging error in the hardware or by a software error. At the moment of the occurrence, however, this decision is irrelevant because the proposed architecture masks the two error types.

LITERATURE CITED

[1] US Pat. Application 20160033965 *Device and Method for the Autonomous Control of Vehicles*, published Feb. 4, 2016
[2] Wikipedia, Autonomes Fahren [*Autonomous driving*,] retrieved on Aug. 11, 2016
[3] Wikipedia, Automotive Safety Integrity Levels ISO 26262, retrieved on Aug. 11, 2016
[4] FAA. *Advisory Circular System Safety Assessment for Part 23 Airplanes*. URL: http://www.faa.gov/documentLibrary/media/Advisory_Circular/AC%2023.1309-1E.pdf retrieved on Aug. 11, 2016
[5] Avizienis, A. *The N-Version Approach to Fault-Tolerant Software*, IEEE Trans. on Software Engineering, Vol 11, pp. 1491-1501. December 1985,
[6] Kopetz, H. *Real-Time Systems, Design Principles for Distributed Embedded Applications*. Springer Verlag. 2011.

We claim:

1. A method for controlling a technical process that is embedded in a changing environment, wherein the electronic system that implements the control system includes sensors, actuators and node computers, in particular a plurality of sensors, actuators and node computers, in particular a plurality of node computers, which exchange data via a real-time communication system, the method comprising:
  differentiating between complex and simple software; and
  implementing the complex software simultaneously on at least two independent data flow paths (DFP) (110, 120), wherein each DFP cyclically monitors the technical process and its environment via sensors and builds a model of the technical process and its environment from the observed data using algorithms and conducts trajectory planning in order to create one or more possible trajectories that correspond to the predetermined destination setting under the given environmental conditions, wherein:
the observed data are diverse and the algorithms used in the DFP are diverse, or
the observed data are not diverse and the algorithms used in the DFP are diverse, or
the observed data are diverse and the algorithms used in the DFP are not diverse, and wherein:
the trajectories developed by the DFPs are given to a decider (150) for deciding,
the decider (150) is executed using simple software,
the decider (150) chooses a trajectory that is proposed by the majority of the DFPs,
the decider (150) transmits the chosen trajectory to an actuator control, and
the decider (150) is implemented on error-tolerant hardware.

2. The method according to claim 1, wherein the trajectories given to the decider (150) are evaluated with respect to safety and effectiveness.

3. The method according to claim 1, wherein the at least two independent data flow paths (DFP) (110, 120) execute software processes that correspond to the predetermined destination setting and an additional DFP (130) has the task of guiding the technical process into a safe state, and wherein, in the event that the decider (150) finds no trajectory that corresponds to the predetermined destination, the trajectory is chosen that guides the technical process into a safe state.

4. The method according to claim 1, wherein assemblies, meaning, for example, the node computers, the communications system, sensors, actuators, preferably all assemblies, have access to an error-tolerant global time and control of the data flow between the node computers is derived from the progression of the global time.

5. The method according to claim 1, wherein data diversity in the DFPs is eliminated and the data received by the sensors is transmitted to a plurality of DFPs.

6. The method according to claim 1, wherein algorithm diversity in the DFPs is eliminated and the same algorithms are used in all DFPs.

7. The method according to claim 1, wherein the data diversity is improved by using different coordinate systems to represent the trajectories.

8. An electronic system for controlling a technical process that is embedded in a changing environment, the electronic system comprising:
a plurality of sensors;
a plurality of actuators; and
a plurality of node computers, which exchange data via a real-time communication system,
wherein:
the system is configured to differentiate between complex and simple software,
the complex software is configured to be simultaneously implemented on at least two independent data flow paths (DFP) (110, 120),
each DFP is configured to cyclically monitor the technical process and its environment via the sensors and to build a model of the technical process and its environment from the observed data using algorithms and to conduct trajectory planning in order to create one or more possible trajectories that correspond to the predetermined destination setting under the given environmental conditions, wherein the observed data are diverse and the algorithms used in the DFP are diverse, or the observed data are not diverse and the algorithms used in the DFP are diverse, or the observed data are diverse and the algorithms used in the DFP are not diverse, and
a decider (150), which is implemented on error-tolerant hardware and executed using simple software, is configured to receive the trajectories developed by the DFPs, to choose a trajectory that is proposed by the majority of the DFPs, and to transmit the chosen trajectory to an actuator control.

* * * * *